UNITED STATES PATENT OFFICE.

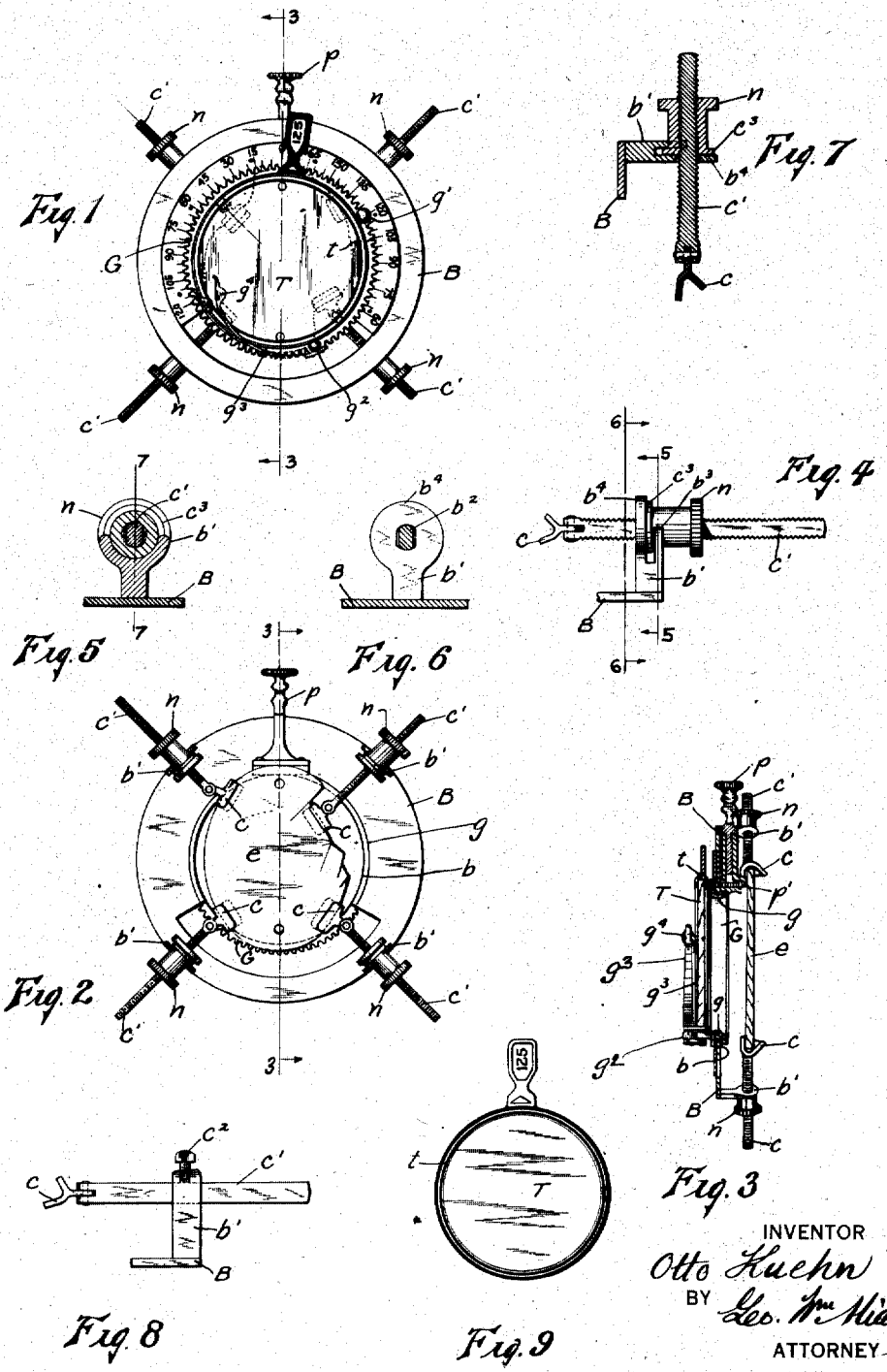

OTTO KUEHN, OF NEW YORK, N. Y.

FOCAL-TESTER FOR EYE-LENSES, &c.

1,280,045.  Specification of Letters Patent.  Patented Sept. 24, 1918.

Application filed December 20, 1917. Serial No. 208,018.

*To all whom it may concern:*

Be it known that I, OTTO KUEHN, a citizen of the United States, and a resident of the borough of Manhattan, city, county, and State of New York, have invented certain new and useful Improvements in Focal-Testers for Eye-Lenses, &c., of which the following is a specification.

The object of my invention is to afford simple but accurate means whereby the focal characteristics or peculiarities of an eye-lens may be expeditiously and conveniently ascertained from the whole or a portion thereof,—as where it is desired to reproduce a "prescription" when the original thereof is not readily available.

The invention consists essentially, in combination and arrangement, with a trial frame adapted to support test lenses in a manner well known in the art, of means whereby the whole or a portion of an eye-glass may be secured and held in proper relation to and upon said trial frame so that test lenses may be utilized to detect the focal structure of the eye-glass examined,—the latter in this case being tested as to requirements for reproduction in a manner similar to that in which the eye itself has heretofore been tested. In other words the requisites for the duplication or reproduction of the eye-glass are ascertained by substantially the same method by which the oculist's prescription was formulated,—the eye-glass or portion thereof being substituted in lieu of the eye.

In the accompanying drawings,

Figure 1 is a front elevation of my focal testing device;

Fig. 2, a rear view of the same;

Fig. 3, is a cross section taken upon plane of line 3—3, Fig. 1;

Fig. 4, is a side elevation of one of the eye-glass clamps;

Fig. 5, is a transverse section thereof, taken upon plane of line 5—5, Fig. 4;

Fig. 6, is a transverse section taken upon plane of line 6—6, Fig. 4;

Fig. 7, is a longitudinal section thereof, taken upon plane of line 7—7, Fig. 5;

Fig. 8, is a view similar to Fig. 4, showing a modification;

Fig. 9, is a test lens mount such as is used in connection with my device.

In the drawings B, represents a base plate, preferably of annular form, in any case formed with a circular opening on the inner annular edge $b$, on which is mounted the gear ring G, for which purpose said gear G, may be formed with an inturned flange $g$, which straddles said annular inner edge $b$, of the base plate B, as shown in Fig. 3.

The gear ring G, carries on its outer or face side a bearing post $g'$, and also a spring post $g^2$, to which latter the fixed ends of the test lens retaining springs $g^3$, $g^3$, are secured,—the free ends of said test lens retaining springs $g^3$, $g^3$, being formed with inturned curved lips $g^4$, $g^4$, which are positioned, approximately, diametrically opposite to the bearing post $g'$. As a matter of fact the bearing post $g'$, spring post $g^2$, and retaining lips $g^4$, $g^4$, occupy relatively slightly more than one-half of the circumference of the gear ring G,—the spring post $g^2$, being situated medially between the bearing post $g'$, and said retaining lips $g^4$. Hence the rim $t$, of an ordinary test lens T, such as shown in Fig. 9, may be positioned and held between these three points $g'$, $g^2$, and $g^4$,—the spring $g^3$, against which the rim rests tending constantly to press said rim against the two aforesaid posts $g'$, $g^2$, thereby sustaining the test lens in position in alinement with the sight opening in the base plate B. Adjacent to the front of the annular inner edge $b$, of the base plate is a degree scale, the 0 mark being in alinement with the stem $p$, of the pinion $p'$, by which the gear wheel G, is rotated. (See Fig. 3.)

As thus far described the device is practically the same as one of the duplicate side members of an oculist's "trial frame," so called, such as used in testing eyesight,—the novelty in the present case consisting in providing upon the base plate B, a plurality of adjustable clamps $c$, $c$, by means of which an eye-glass, or a portion of one, may be held temporarily in proper alinement with the sight opening in the base plate B, in such manner that its focal value or register may be ascertained by means of trial lenses inserted between the posts $g'$, $g^2$, and retaining springs $g^3$, on the gear ring G,—the test being continued therewith until a trial lens, or a combination of trial lenses, is found by which the focal effects of the eye-glass are matched and neutralized. Thus, the longitudinal axis of the eye-glass, or portion thereof under observation, being set in approximate alinement with the 0 mark on the scale on the front of the base plate, and the trial lenses being in like manner set and read with relation thereto, it is obvious that when the proper lens, or combination of lenses, is found the denomination number or numbers thereof, taken in connection with the scale reading, will give the focal requirements and peculiarities of the eye-glass examined in essentially the same manner in which a like result would be attained by the testing of the eye itself. Hence, if an original prescription is lost or not available it may readily be duplicated from an eye-glass, or portion thereof if broken, and the trouble, delay, expense and inconvenience of another eye-test or examination obviated.

It is obvious in this connection that the adjustment of the eye-glass clamps $c$, $c$, may be effected by resort to various well known mechanical expedients, so that I do not limit myself in this respect, the clamps and the mounting thereof shown in the accompanying drawings indicating the principle involved,—the distinctive feature of my invention being the provision of suitable clamping means whereby an eye-lens or portion thereof, may be mounted rigidly on the base plate B, in proper relation to the sight opening therein to bring it into operative alinement with a test lens or lenses mounted on the rotatable gear ring G, in the manner usual in testing eye-sight.

While any plural number of these eye-lens clamps $c$, may be provided, and at least three of them are desirable, I have in the drawings shown the use of four, each pivotally attached to the inner end of its own adjustable rod or stem $c'$. These clamp rods $c'$, are mounted on standards $b'$, on the back of the base plate B, in such manner that while capable of longitudinal adjustment thereon they cannot turn laterally on their longitudinal axes. The simplest way to effect this result (although it might obviously be done by splining) is to flatten each rod on one or more sides and to pass it through a correspondingly shaped slot or recess $b^2$, in its standard $b'$, as shown by way of illustration in Fig. 6. In the modification shown in Fig. 8, a rod $c'$, angular in cross section is slidable in a correspondingly shaped socket in the standard $b'$, and secured in desired position by a set screw $c^2$. In the other views the clamp rods $c'$, are screw threaded and engage with correspondingly threaded nuts $n$, rotatable on the standards $b'$, to which they are connected by means of flanges $c^3$, fitting between shoulders $b^3$, on the standards and the guide members $b^4$, of the latter through which the clamp rods $c'$, project as previously stated.

The clamp jaws $c$, being pivotally mounted on the inner ends of their adjustable rods or stems $c'$, readily adapt themselves to any curvature or irregularity of edge of the eye-glass, or portion thereof, $e$, placed between them, and are held firmly in contact therewith by means of the nut $n$, or set screw $c^2$, as the case may be.

What I claim as my invention and desire to secure by Letters Patent is,

1. A focal testing device of the character designated, comprising a base plate formed with a sight opening, a test lens holder rotatably mounted on said base plate and a plurality of independently adjustable pivoted clamping jaws supported from said base plate and disposed radially for rigidly supporting an eye lens or portion thereof.

2. A focal testing device of the character designated, comprising a base plate formed with a sight opening, a test lens holder rotatably mounted on said base plate and a plurality of independently adjustable pivoted clamping jaws supported from said base plate and disposed radially for rigidly supporting an eye lens or portion thereof in alinement with said sight opening.

3. A focal testing device of the character designated, comprising a base plate formed with a sight opening, a test lens holder rotatably mounted on said base plate, stems radially adjustable in said base plate, and clamping jaws pivotally mounted on said stems for rigidly supporting an eye lens or portion thereof.

4. A focal testing device of the character designated, comprising a base plate formed with a sight opening, a test lens holder rotatably mounted on said base plate, stems radially adjustable in said base plate, clamping jaws pivotally mounted on said stems for rigidly supporting an eye lens or portion thereof, and a scale on said base plate readable with relation to said rotatable test lens holder.

5. A focal testing device of the character designated, comprising a base plate formed with a sight opening, a test lens holder rotatably mounted on said base plate, radially disposed stems adjustably carried by said base plate and clamps pivotally mounted on said stems and means for holding each of said stems in adjusted positions independently of the others.

OTTO KUEHN.

Witnesses:
Dorothy Myatt,
Geo. Wm. Myatt.